H. W. HARVEY.
HANDLE SECURING DEVICE.
APPLICATION FILED APR. 25, 1916.
1,196,683.
Patented Aug. 29, 1916.
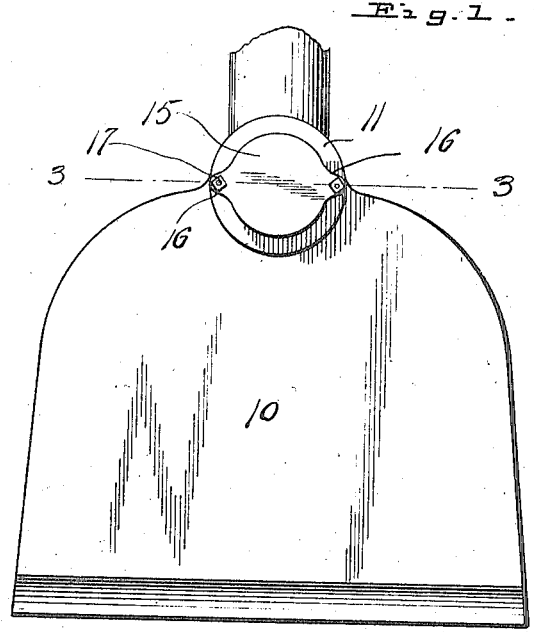
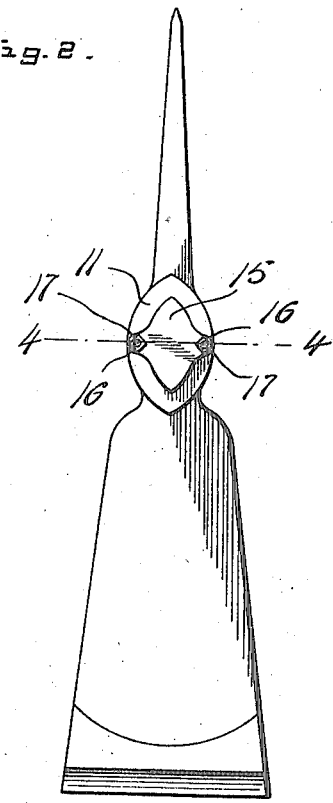
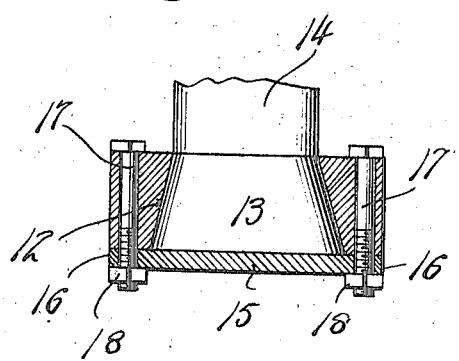
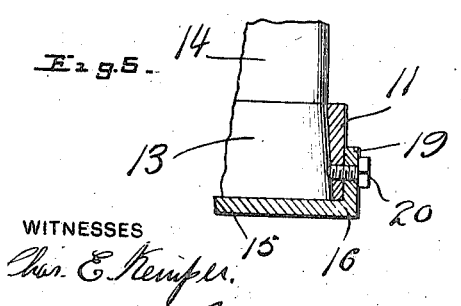
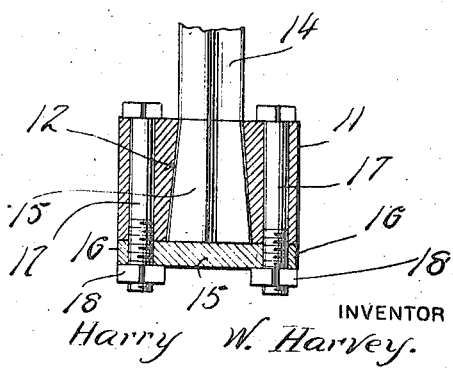
WITNESSES
INVENTOR
Harry W. Harvey.
BY
ATTORNEY

UNITED STATES PATENT OFFICE.

HARRY W. HARVEY, OF SAN BENITO, TEXAS.

HANDLE-SECURING DEVICE.

1,196,683.

Specification of Letters Patent.

Patented Aug. 29, 1916.

Application filed April 25, 1916. Serial No. 93,499.

*To all whom it may concern:*

Be it known that I, HARRY W. HARVEY, a citizen of the United States, residing at San Benito, in the county of Cameron and State of Texas, have invented certain new and useful Improvements in Handle-Securing Devices, of which the following is a specification.

This invention relates to a novel means for securing handles on hoes, mattocks, picks and other implements of the kind in which the handle has an enlarged end where it passes through and seats in the eye of the tool, and has for its object to provide a simple, secure and easily applied means for maintaining the handle in place and at the same time permitting ready detachment of the same.

A further object of the invention is to provide such a device which may be applied with very little change in the present construction of the implements on which it is used.

With these and other objects in view the invention consists in the novel features of construction, combination and arrangement of parts as will be hereinafter more fully described, illustrated in the accompanying drawings and claimed.

Figure 1 is an outside face view of one type of hoe showing the invention applied thereto, Fig. 2 is a similar view of a mattock with the securing device in place, Fig. 3 is a cross sectional view on the line 3—3 of Fig. 1, Fig. 4 is a similar view on the line 4—4 of Fig. 2, and Fig. 5 is a view of a modification.

Referring to the drawing in which similar reference characters designate corresponding parts throughout the several views, 10 indicates the blade of a hoe at the top of which is the usual socket 11 through which is formed an eye 12 to receive one end 13 of the handle 14. The handle end 13 in implements of this kind tapers outwardly from the body of the handle and is largest at its extreme end. The eyes of implements fitted with handles of this type taper similarly so that when the handle is fitted to the implement and the latter becomes seated on the outer end 13 this enlarged end prevents the implement from being disconnected. Great difficulty however has been experienced in obtaining a firm connection between the handle and the implement, and numerous expedients have been resorted to such as driving nails, screws and various other articles into the handle for the purpose of maintaining a tight fit with the implement. To overcome this difficulty I provide a plate of metal 15 of suitable thickness to resist rough usage and diametrically of substantially the same size and shape as the hole 12 in the socket 11. Integral with this plate and projecting laterally therefrom in opposite directions are two ears 16 through each of which is formed a hole for the passage of a bolt 17, said bolts also passing through similar holes in the socket 11. Nuts 18 screwed on the bolts 17 maintain the plate in position.

As shown in Figs. 1 and 3 the socket 11 of the hoe is preferably made thicker than usual to provide sufficient metal through which the holes may be made for the bolts 17.

A modification of the fastening means for securing the plate 15 in position particularly when used with implements now in the market that have relatively thin sockets, is shown in Fig. 5. In this form of device the ears 16 of the plate 15 are made longer and are turned inwardly to lie against the sides of the socket. These inturned portions 19 have holes through them for fastening bolts 20 that screw into the socket 11 of the implement, or if preferred a single bolt may be used to pass entirely through the socket, ears and handle from side to side as may be readily understood.

For other implements than the hoe, the securing plates 15 are similar as to size and general shape which latter varies slightly as the shape of the eye and handle demand, as for instance when used on a mattock as illustrated in Fig. 2, the plate 15 will be substantially elliptical with ears 16 on opposite sides thereof and bolts 17 securing the plate to the socket of the mattock.

Having thus described my invention what I desire to secure by Letters Patent is:

1. In an implement of the kind described having a tapering eye therethrough enlarged at its outer end for the similarly enlarged end of a handle, a plate covering the eye over the handle end and removable means for securing said plate to the implement.

2. In an implement of the kind described having a handle socket and an outwardly tapering eye therethrough to receive and seat the enlarged tapered end of the handle, a securing plate covering said eye and the enlarged end of the handle and fastened to said socket by bolts passing therethrough and through the plate.

3. In an implement having a handle socket provided with an outwardly tapering eye to receive and seat the enlarged tapering end of a handle, a securing plate for the handle fitting against the end of the socket and bearing against the end of the handle, and bolts passing through projections on said plate and through the socket.

4. Means for securing the enlarged end of a handle to an implement, the same consisting of a plate bearing against the enlarged end of the handle and against the implement and having projecting ears, and bolts passing through said ears and implement.

5. A handle securing device comprising a flat plate having laterally projecting ears, combined with an implement having a handle formed with an enlarged end seated in an eye therein, and bolts passing through holes in said ears and said implement to press the plate against the end of the handle.

6. Means for securing the enlarged end of a handle to an implement having an outwardly tapering eye, the same consisting of a plate bearing against said enlarged end and wholly covering the larger end of the eye through which it passes, and removable means engaging said plate and implement only, for fastening the plate to the implement.

In testimony whereof I affix my signature in presence of two witnesses.

HARRY W. HARVEY.

Witnesses:
 FLORENE W. HARVEY,
 Mrs. J. Y. HARVEY.